(12) United States Patent
Kim

(10) Patent No.: US 10,869,019 B2
(45) Date of Patent: Dec. 15, 2020

(54) DUAL DEPTH CAMERA MODULE WITHOUT BLIND SPOT

(71) Applicant: Syscon Engineering Co., Ltd., Incheon (KR)

(72) Inventor: Heung Soo Kim, Namyangju-si (KR)

(73) Assignee: SYSCON ENGINEERING CO., LTD., Incheon (KR)

( * ) Notice: Subject to any disclaimer, the term of this patent is extended or adjusted under 35 U.S.C. 154(b) by 0 days.

(21) Appl. No.: 16/709,133

(22) Filed: Dec. 10, 2019

(65) Prior Publication Data

US 2020/0236339 A1    Jul. 23, 2020

(30) Foreign Application Priority Data

Jan. 22, 2019    (KR) .................... 10-2019-0008069

(51) Int. Cl.
*H04N 13/239*    (2018.01)
*H04N 13/00*    (2018.01)
*H04N 5/225*    (2006.01)

(52) U.S. Cl.
CPC ......... *H04N 13/239* (2018.05); *H04N 5/2252* (2013.01); *H04N 5/2253* (2013.01); *H04N 5/2254* (2013.01); *H04N 2013/0081* (2013.01); *H04N 2213/001* (2013.01)

(58) Field of Classification Search
CPC .. H04N 13/239; H04N 13/271; H04N 5/2253; H04N 5/2254; H04N 5/28296; H04N 5/3415; H04N 2013/0081
See application file for complete search history.

(56) References Cited

U.S. PATENT DOCUMENTS

| | | | | |
|---|---|---|---|---|
| 6,094,125 | A * | 7/2000 | Ito | H01F 41/024 336/217 |
| 7,961,234 | B2 * | 6/2011 | Viinikanoja | H04N 13/239 348/264 |
| 8,072,517 | B2 * | 12/2011 | Chang | G03B 37/00 348/262 |
| 8,121,352 | B2 * | 2/2012 | Arias-Estrada | G06T 7/593 345/419 |
| 8,243,123 | B1 * | 8/2012 | Geshwind | H04N 13/239 348/42 |
| 8,406,619 | B2 * | 3/2013 | Cameron | H04N 13/363 396/325 |

(Continued)

FOREIGN PATENT DOCUMENTS

| | | |
|---|---|---|
| KR | 100803504 | 2/2008 |
| KR | 20160030694 | 3/2016 |

OTHER PUBLICATIONS

Korean Office Action—Korean Application No. 10-2019-0008069 dated Feb. 18, 2019, citing KR 10-0803504.

*Primary Examiner* — Brian P Yenke
(74) *Attorney, Agent, or Firm* — Cantor Colburn LLP

(57) ABSTRACT

A dual depth camera module provided in a mobile robot is provided. In the dual depth camera module, a first depth camera and a second depth camera each have a turned shape at a first angle to face each other with respect to an extending line in a proceeding direction of a mobile robot, and the first depth camera and the second depth camera each have an inclined shape at a second angle to face each other in a direction opposite a surface of the ground with respect to a vertical extending line in the proceeding direction of the mobile robot.

3 Claims, 4 Drawing Sheets

(56) References Cited

U.S. PATENT DOCUMENTS

| | | | |
|---|---|---|---|
| 8,694,195 B2 * | 4/2014 | Lee | B60R 1/00 701/28 |
| 8,885,040 B2 * | 11/2014 | Puah | G01B 11/0608 348/126 |
| 9,071,738 B2 * | 6/2015 | Pace | H04N 5/247 |
| 9,098,908 B2 * | 8/2015 | Kirk | G06T 7/593 |
| 9,319,660 B2 * | 4/2016 | Liou | H04N 13/239 |
| 9,426,361 B2 * | 8/2016 | Venkataraman | H04N 5/265 |
| 10,110,875 B2 * | 10/2018 | Mistry | G03B 35/10 |
| 10,291,902 B2 * | 5/2019 | Zhao | G01C 3/14 |
| 10,469,758 B2 * | 11/2019 | Price | H04N 13/239 |
| 10,701,344 B2 * | 6/2020 | Nakajima | H04N 7/142 |
| 2006/0237634 A1 * | 10/2006 | Kim | G01S 17/48 250/221 |
| 2009/0143967 A1 * | 6/2009 | Lee | B60R 1/00 701/119 |
| 2010/0097444 A1 * | 4/2010 | Lablans | H04N 5/23238 348/46 |
| 2010/0265369 A1 * | 10/2010 | Chang | G03B 37/00 348/262 |
| 2010/0295926 A1 * | 11/2010 | Estrada | G06T 7/586 348/47 |
| 2015/0042765 A1 * | 2/2015 | Pfister | H04N 13/282 348/48 |
| 2015/0085083 A1 * | 3/2015 | Chen | H04N 13/296 348/49 |
| 2015/0124060 A1 * | 5/2015 | Hasegawa | H04N 13/204 348/47 |
| 2016/0198144 A1 * | 7/2016 | Yu | H04N 13/243 348/48 |
| 2016/0212408 A1 * | 7/2016 | Zhao | G01B 11/026 |
| 2017/0078568 A1 * | 3/2017 | Venkataraman | H04N 5/265 |
| 2017/0366749 A1 * | 12/2017 | Zolotov | H04N 1/00204 |
| 2018/0052457 A1 * | 2/2018 | Kim | H04N 13/296 |
| 2019/0025849 A1 * | 1/2019 | Dean | H04N 5/23212 |
| 2019/0149802 A1 * | 5/2019 | Tanaka | H04N 13/239 348/43 |
| 2019/0378294 A1 * | 12/2019 | Zhang | H04N 13/204 |
| 2020/0059636 A1 * | 2/2020 | Cheng | H04N 13/229 |
| 2020/0134848 A1 * | 4/2020 | El-Khamy | H04N 13/243 |

* cited by examiner

PROCEEDING DIRECTION OF APPARATUS

DUAL DEPTH CAMERA MODULE WITHOUT BLIND SPOT

BACKGROUND

1. Technical Field

The present invention relates to a dual depth camera module. Specifically, the present invention relates to a dual depth camera module formed at a specific angle to eliminate a blind spot.

2. Description of the Related Art

With the expansion of the robotics industry, many studies on depth cameras that construct 3D maps by measuring a distance in an indoor environment have been conducted. Thereamong, recently, an application field of Kinect of Microsoft, which has explosively spread at a low price, is expanded to not only human gestures recognition for games as an inherent function of Kinect of Microsoft, but also fields of recognition of various objects in the room and recognition of a plurality of human gestures.

A 3D depth camera used in the present invention is a technology capable of calculating a depth value of each pixel of an image, and displays a 3D image by calculating a depth of the pixel by various techniques using a dual camera module unlike a conventional 2D method which processes with only one camera module.

A general dual stereo method is a method which makes a stereoscopic image by coupling two 2D image sensors. In order to measure a distance from an object to be measured, a pair of nearly identical cameras are used to use viewpoint mismatches between the cameras. In this approach, the centers of eyes of the two cameras are divided into a baseline or an inter-pupillary distance (IPD) to generate a parallax required for depth measurement, and generally, optical axes of the cameras are orthogonal to planes which are parallel to each other and perspective.

According to the conventional art, two stereo cameras are installed on one substrate to extract more accurate distance information by matching distance maps of reference objects obtained from the two stereo cameras. Specifically, in the past, a method in which two stereo cameras are linearly disposed to improve accuracy of distance maps was used.

However, in the conventional art, due to a limitation in an angle of view, in Korea Patent Publication No. 10-2014-0120184, a method in which two depth cameras are intersected to have different viewpoints is used. In this case, the two depth cameras are intersected to overcome the limitation in the angle of view, but the cameras cannot cope with a blind spot which should be generated due to a minimum effective distance of the camera.

SUMMARY

1. Technical Problem

A technical objective of the present invention is to provide a dual depth camera having a structure and shape capable of removing a blind spot generated at a minimum effective distance of the dual depth camera module.

2. Solution to Problem

In a dual depth camera module according to the present invention, a first depth camera and a second depth camera each have a turned shape at a first angle to face each other with respect to an extending line in a proceeding direction of a mobile robot, and the first depth camera and the second depth camera each have an inclined shape at a second angle in a direction opposite a surface of the ground with respect to a vertical extending line in the proceeding direction of the mobile robot Here, the first depth camera and the second depth camera may be provided to be spaced apart from each other at a predetermined interval.

3. Advantageous Effects

Using a dual depth camera module according to one embodiment of the present invention, an object within a minimum effective distance of a depth camera provided in one side surface can be imaged by a depth camera provided in the other side surface.

Further, the dual depth camera module according to one embodiment of the present invention can image an area of almost 180° in a frontward direction.

In addition, the dual depth camera module according to one embodiment of the present invention can even cope with the sudden appearance of an object which cannot be recognized in a frontward view.

DETAILED DESCRIPTION OF EMBODIMENTS

Hereinafter, specific embodiments of the present invention will be described. However, the spirit of the present disclosure is not limited to the embodiments which will be described later, and those skilled in the art may provide other embodiments that fall within the scope of the same spirit of the present invention through the addition, change, or removal of the components, but the above are also included in the scope of the spirit of the present invention.

In the accompanying drawings, to describe the spirit of the present invention so as to be easily understood when an overall structure is described, minute parts may not specifically described, and the overall structure may not specifically reflected when the minute parts are described. Further, although details such as an installation location and the like are different, since the same name is provided when actions are the same, convenience of understanding may be improved. Further, when a plurality of the same configurations are present, only one configuration will be described and descriptions of other configurations will be described by applying the same description.

Figure 1:
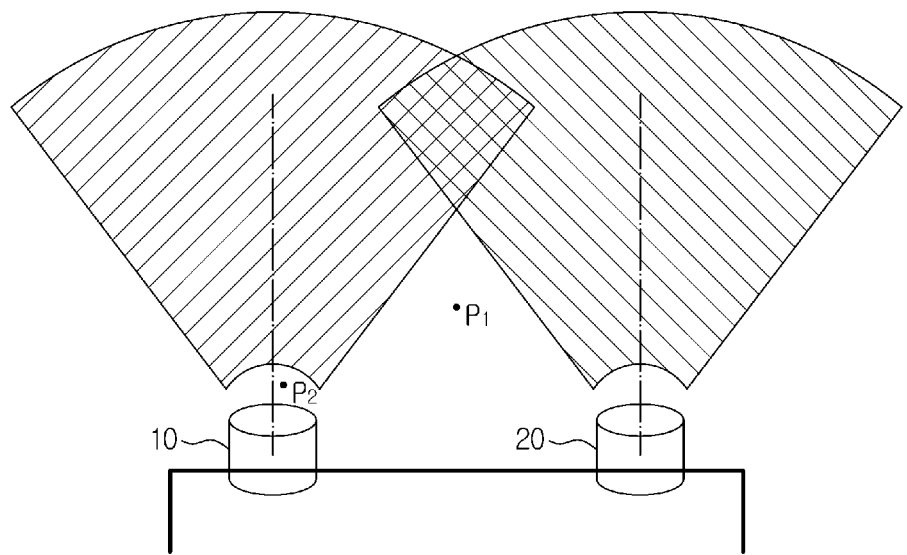
FIG. 1 is a view simply illustrating a conventional dual depth camera module.

FIG. 1 is a view simply illustrating a conventional dual depth camera module.

As shown in FIG. 1, in the conventional dual depth camera module, a first depth camera 10 and a second depth camera 20 are disposed in parallel with a proceeding direction. In the depth camera, an angle of view in a horizontal direction is fixed (generally 85°), and a minimum effective distance is present. Here, the minimum effective distance refers to a physically imageable distance from a lens to an object.

A portion shaded in FIG. 1 refers to an imageable area in consideration of the angle of view and the minimum effective distance of the depth camera. Accordingly, when an object is present at a portion which is not shaded, the depth camera may not obtain an image of the object. P1 in FIG. 1 is a blind spot which may be generated due to a limitation in the angle of view of the depth cameras, and P2 is a blind spot may be generated due to the minimum effective distance of the depth camera.

The case of P1 may be partially addressed by reducing an interval between the depth cameras, but in this case, an overall lateral view is reduced. Further, P2 is an area which may not be physically covered by the depth cameras. In general operation, since an apparatus in which the depth camera module is installed continuously operates, the above-described blind spot may not be a problem. However, when the object is suddenly placed within the minimum effective distance such as directly after powering on an apparatus in which the dual depth camera module is installed, since the image may not be obtained before the object enters the blind spot, the depth camera module may not recognize the object.

Accordingly, hereinafter, the structure and shape of the dual depth camera module capable of removing the blind spots which may be generated from the dual depth camera will be provided.

Figure 2:
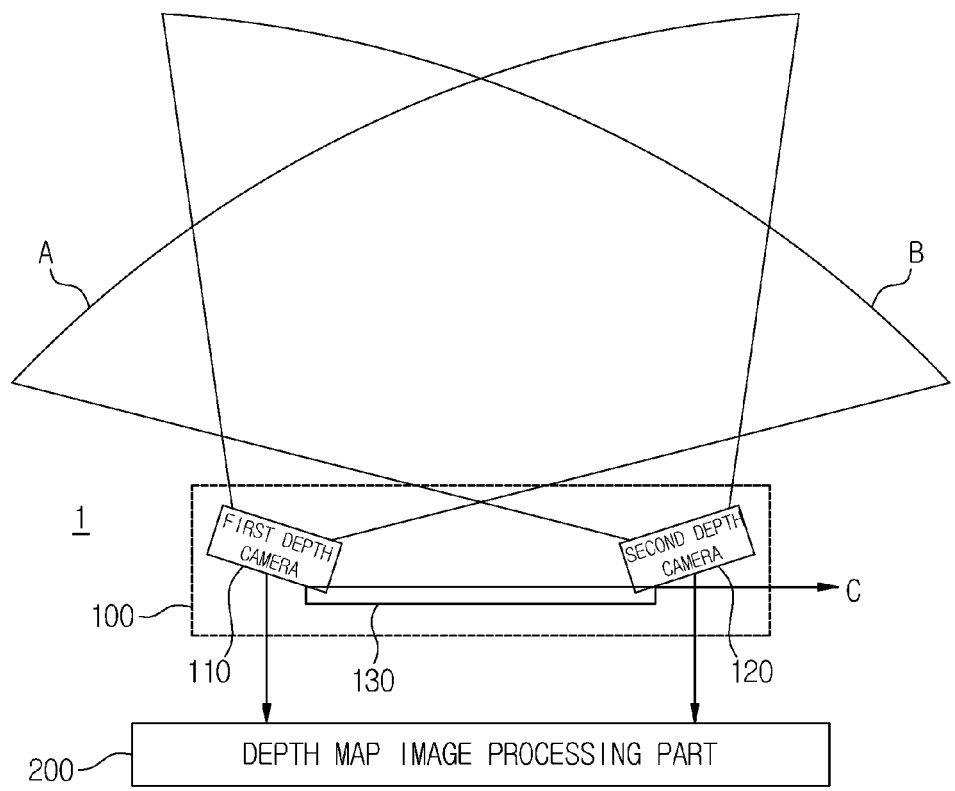
FIG. 2 is a view simply illustrating a depth camera system according to one embodiment of the present invention.

FIG. 2 is a view simply illustrating a depth camera system according to one embodiment of the present invention.

As shown in FIG. 2, a depth camera system 1 according to one embodiment of the present invention may include a first depth camera 110 and a second depth camera 120 configured to obtain depth images having depth information, a camera module housing 130, and a depth map image processing part 200 configured to process a first depth image obtained by the first depth camera 110 and a second depth image obtained by the second depth camera.

The first depth camera 110 and the second depth camera 120 sense the depth information of imaging areas A and B. Further, the depth map image processing part 200 may generate a three-dimensional map by processing the depth information obtained from the first depth camera 110 and the second depth camera 120. Here, the depth map image processing part 200 may refer to a library and a developing tool provided in a robot operating system (ROS), or a processor which runs the library or the developing tool.

The camera module housing 130 forms a body, and the first depth camera 110 and the second depth camera 120 are provided at both lateral ends of the camera module housing 130. The first depth camera 110, the second depth camera 120, and the camera module housing 130 may be collectively referred to as a dual depth camera module 100.

The camera module housing 130 may refer to a part of a front surface of an apparatus in which the dual depth camera module 100 is provided. Here, the apparatus in which the dual depth camera module 100 is provided may be, for example, a mobile robot.

Meanwhile, although FIG. 2 illustrates the camera module housing 130 as a rectangular shape, this is merely one example, and a shape of the camera module housing 130 may be partially modified as necessary. Hereinafter, a description assuming the shape of the camera module housing 130 has a front surface which extends in a direction vertical to a proceeding direction of the apparatus will be made.

As shown in FIG. 2, in the dual depth camera module 100 according to one embodiment of the present invention, the first depth camera 110 and the second depth camera 120 are each formed in a shape turned inwardly at a specific angle in a proceeding direction on the basis of a horizontal reference line C of the camera module housing 130 to remove the blind spot due to the minimum effective distance. Hereinafter, the features of the present invention will be described in more detail.

Although conventional dual depth cameras image sides on which the dual depth cameras are mounted, the depth cameras according to one embodiment of the present invention are formed to face each other at a predetermined angle to image areas opposite to the sides on which the depth cameras are mounted. As illustrated in FIG. 2, the first depth camera 110 images area B close to the second depth camera 120, and the second depth camera 120 images area A close to the first depth camera. Accordingly, an apparatus in which the dual depth camera module is mounted through the first depth camera 110 and the second depth camera 120 may image an area for an angle twice a horizontal angle of view of the depth cameras. For example, when the horizontal angle of view of the depth cameras is 85°, since each depth camera images an area of 85° in a frontward direction, an area of up to 170° may be imaged.

Figure 3:
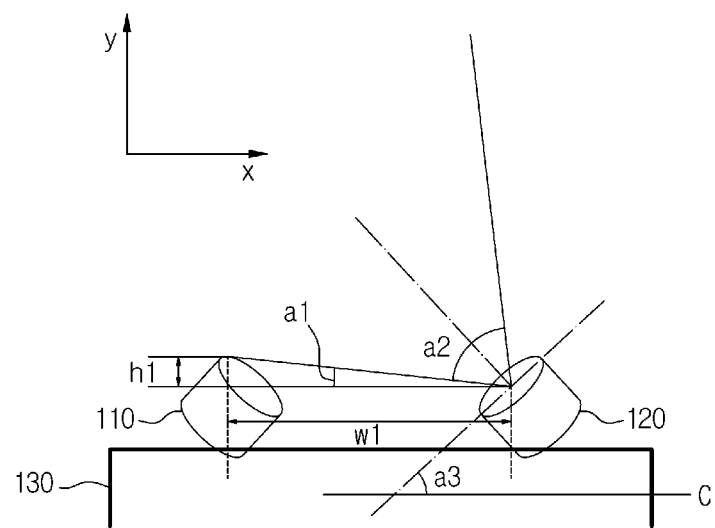
FIG. 3 is a view illustrating a case in which a dual depth camera module according to one embodiment of the present invention is viewed from above.

FIG. 3 is a view illustrating a case in which a dual depth camera module according to one embodiment of the present invention is viewed from above.

In FIG. 3, a y-axis is a proceeding direction of the apparatus on which the dual depth camera module 100 is mounted, and an x-axis is a direction vertical to the proceeding direction. Further, both the first depth camera 110 and the second depth camera 120 are each provided with a lens in a center of a surface in an imaging direction. In other words, the first depth camera 110 and the second depth camera 120 are each provided with the lens to obtain an image in the center thereof, and a depth camera housing is formed around the lens.

As shown in FIG. 3, the first depth camera 110 and the second depth camera 120 are formed to be each turned inwardly at a specific angle a3 in the proceeding direction with respect to an extending line in a horizontal direction of the camera module housing 130 (the x-axis).

In this case, the first depth camera 110 and the second depth camera 120 each have a shape turned to form a facing shape. Further, as shown in FIG. 2, the first depth camera 110 and the second depth camera 120 are formed to be turned at a predetermined angle in a z-axis direction, which will be described in detail with reference to FIG. 4.

The turning angle a3 of each of the first depth camera 110 and the second depth camera 120 is determined on the basis of a distance w1 from the lens of the second depth camera 120 to an edge of the first depth camera 110 in an x-axis direction, a distance h1 from the lens of the second depth camera 120 to the edge of the first depth camera 110 in a y-axis direction, and a horizontal angle a2 of the second depth camera 120.

Here, the horizontal angle a2 of the second depth camera 120 refers to an angle of view of the second depth camera 120 in a horizontal direction. Further, the depth camera edge refers to an end of the camera housing constituting a body of the depth camera.

Specifically, a minimum panning angle a1 is determined from the distances w1 and h1. a1 may be obtained by taking the inverse tangent of h1/w1. Further, the turning angle a3 of each of the first depth camera 110 and the second depth camera 120 is determined on the basis of the minimum panning angle a1 and the camera panning angle a2. Specifically, the turning angle a3 is determined as an angle in which half of the camera panning angle a2 is subtracted and then the minimum panning angle a1 is subtracted from 90°.

Meanwhile, in the dual depth camera module 100 according to one embodiment of the present invention, a distance between the depth cameras may be adjusted according to a horizontal angle minimum effective distance. Since the second depth camera 120 should cover an area which may not be imaged by the first depth camera 110, the distance between the first depth camera 110 and the second depth camera 120 is at least greater than the horizontal angle minimum effective distance between the first depth camera 110 and the second depth camera 120. Here, the distance between the first depth camera 110 and the second depth camera 120 may be specifically a distance from the lens of the first depth camera 110 to the lens of the second depth camera 120.

Figure 4:
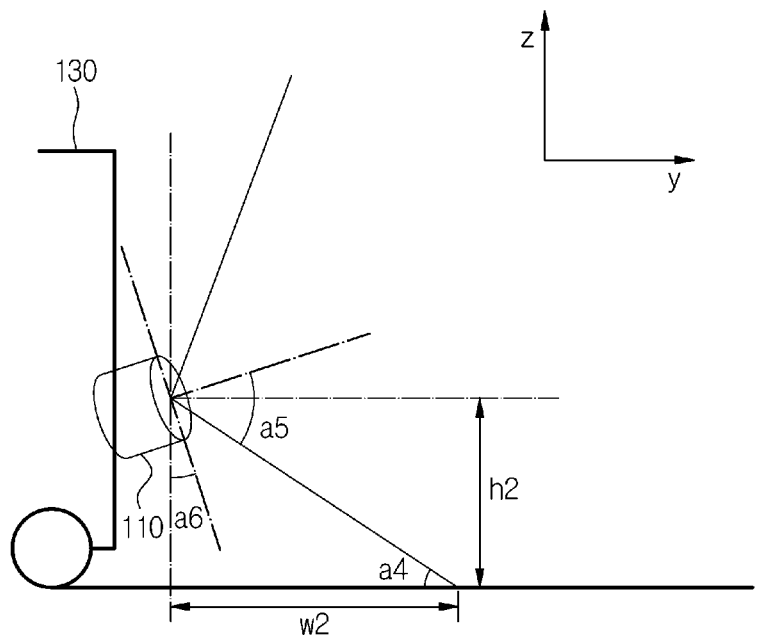
FIG. 4 is a view illustrating a case in which the dual depth camera module according to one embodiment of the present invention is viewed from the side.

FIG. 4 is a view illustrating a case in which the dual depth camera module according to one embodiment of the present invention is viewed from the side.

In FIG. 4, although only the first depth camera 110 is shown, the second depth camera 120 is also formed in the same shape as that of the first depth camera 110, and accordingly, a detailed description thereof will be omitted and the first depth camera 110 will be mainly described.

As shown in FIG. 4, the first depth camera 110 of the dual depth camera module 100 according to one embodiment of the present invention may be formed to be inclined at a specific angle a6 with respect to a line vertical to the ground. Here, the first depth camera 110 may be formed to be inclined in a direction opposite the ground at the specific angle a6 with respect to the line vertical to the ground.

The inclined angle a6 of the first depth camera 110 is determined on the basis of a minimum effective distance w2, a height h2 from the ground to the lens, and an angle a5 which is half of a depth camera vertical angle. Here, the minimum effective distance w2 is determined by a minimum imageable distance of the depth camera, and refers to a minimum distance to an identifiable object according to the minimum imageable distance of the depth camera. Further, the depth camera vertical angle refers to an angle of view of the depth camera in a vertical direction.

A minimum distance angle a4 is determined on the basis of the minimum effective distance w2 and the lens height h2. Specifically, the minimum distance angle a4 may be determined by taking the inverse tangent of h2/w2.

Further, the inclined angle a6 of the depth camera is determined by the minimum distance angle a4 and the camera vertical angle. Specifically, the inclined angle a6 of the depth camera is determined as an angle in which minimum distance angle a4 is subtracted from the angle a5 which is half of the depth camera vertical angle.

Figure 5:
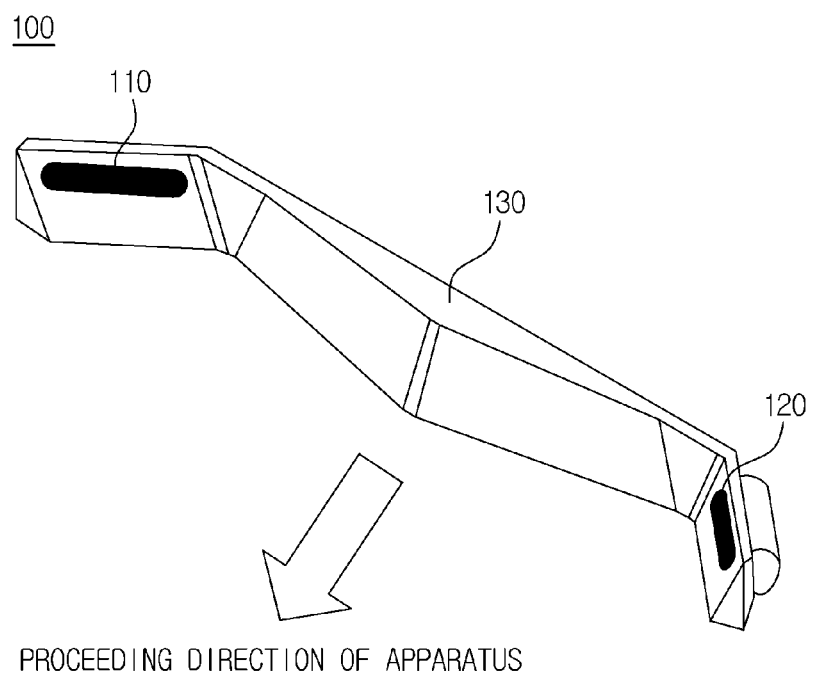
FIG. 5 illustrates an exemplary example of the dual depth camera module according to one embodiment of the present invention

FIG. 5 illustrates an exemplary example of the dual depth camera module 100 according to one embodiment of the present invention.

As shown in FIG. 5, the first depth camera 110 and the second depth camera 120 may be provided on both lateral ends of the camera module housing 130 to be spaced apart from each other at a predetermined interval. Further, the first depth camera 110 and the second depth camera 120 each have a turned shape at a specific angle to face each other with respect to an extending line in a proceeding direction of a mobile robot on which the dual depth camera module is mounted. Further, the first depth camera 110 and the second depth camera 120 each have an inclined shape at a specific angle to face each other with respect to a vertical extending line in the proceeding direction of the mobile robot on which the dual depth camera module is mounted. Preferably, the surface in the imaging direction of each of the first depth camera 110 and the second depth camera 120 may be inclined toward a side opposite the surface of the ground.

Accordingly, the turning angle and the inclined angle of the depth camera may be adjusted in consideration of the distance between the depth cameras or a specification of the depth camera (for example, the minimum effective distance or the horizontal/vertical angle of view), and using the dual depth camera module provided with the depth cameras, horizontal and vertical blind spots may be greatly minimized in comparison with a conventional method.

Specifically, as shown in FIG. 5, when the dual depth camera module is implemented, an object within the minimum effective distance of the first depth camera 110 may be imaged by second depth camera 120, and on the other hand, an object within the minimum effective distance of the second depth camera 120 may be imaged by the first depth camera 110, and thus the blind spots generated due to the minimum effective distances of the depth cameras may be removed.

The above description should not be interpreted with limiting in all aspects, and should be considered as illustrative. The scope of the present invention should be determined by rational interpretation of the appended claims, and all changes in equivalents of the present invention are included in the scope of the present invention.

What is claimed is:

1. A dual depth camera module provided in a front surface of a mobile robot, the dual depth camera module comprising:
    a camera module housing; and
    a first depth camera and a second depth camera provided at both lateral ends of the camera module housing,
    wherein the first depth camera and the second depth camera each are turned at a first angle to face each other with respect to an extending line in a proceeding direction of the mobile robot, and thus the second depth camera covers a blind spot generated due to a minimum effective distance of the first depth camera in a horizontal direction, and the first depth camera covers a blind spot generated due to a minimum effective distance of the second depth camera in a horizontal direction, and
    the first depth camera and the second depth camera are each inclined at a second angle in a direction opposite a surface of the ground with respect to a vertical extending line in the proceeding direction of the mobile robot, and thus the first depth camera and the second depth camera have a shape in which a horizontal distance between a point where imaging scope of a vertical angle of view of the first depth camera or the second depth camera comes into contact with the surface of the ground and the first depth camera or the second depth camera becomes the minimum effective distance of the first depth camera or the second depth camera, and
    the first depth camera and the second depth camera are spaced apart from each other by a distance greater than the minimum effective distances of the first depth camera and the second depth camera.

2. The dual depth camera module according to claim 1, wherein:
- a lens is provided in a center of a surface in an imaging direction in each of the first depth camera and the second depth camera; and
- the first angle is determined on the basis of a distance from the first depth camera lens to an edge of the second depth camera in an x-axis direction, a distance from the first depth camera lens to an edge of the second depth camera in a y-axis direction, and a horizontal angle of view of the first depth camera.

3. The dual depth camera module of claim 1, wherein:
- a lens is provided in a center of a surface in an imaging direction in each of the first depth camera and the second depth camera; and
- the second angle is determined on the basis of the minimum effective distance of the first depth camera, a height from the ground to the lens provided in the first depth camera, and a vertical angle of view of the first depth camera.

* * * * *